(12) United States Patent
Ellul et al.

(10) Patent No.: US 7,439,304 B2
(45) Date of Patent: Oct. 21, 2008

(54) THERMOPLASTIC VULCANIZATES AND PROCESS FOR MAKING THE SAME

(75) Inventors: Maria D. Ellul, Silver Lake Village, OH (US); Christopher Hrbacek, Pensacola, FL (US)

(73) Assignee: Advanced Elastomer Systems, L.P., Akron, OH (US)

( * ) Notice: Subject to any disclaimer, the term of this patent is extended or adjusted under 35 U.S.C. 154(b) by 150 days.

(21) Appl. No.: 10/931,621

(22) Filed: Sep. 1, 2004

(65) Prior Publication Data

US 2005/0272871 A1  Dec. 8, 2005

(51) Int. Cl.
*C08J 3/24* (2006.01)
*C08K 13/02* (2006.01)
*C08L 21/00* (2006.01)

(52) U.S. Cl. ............... 525/191; 524/101; 524/106; 524/291; 524/342; 524/400; 525/133; 525/134; 525/139; 525/141; 525/456

(58) Field of Classification Search ............... None
See application file for complete search history.

(56) References Cited

U.S. PATENT DOCUMENTS

| | | | |
|---|---|---|---|
| 4,212,787 A | 7/1980 | Matsuda | |
| 4,247,652 A | 1/1981 | Matsuda | |
| 4,311,628 A | 1/1982 | Abdou-Sabet | |
| 4,594,390 A | 6/1986 | Abdou-Sabet | |
| 4,889,888 A | 12/1989 | Bassi | |
| 5,952,425 A | 9/1999 | Medsker et al. | |
| 6,051,681 A | 4/2000 | Dozeman | |
| 6,110,546 A | 8/2000 | Honda | |
| 6,143,828 A | 11/2000 | Chee | |
| 6,150,464 A | 11/2000 | Medsker | |
| 6,251,998 B1 | 6/2001 | Medsker | |
| 6,313,208 B1 | 11/2001 | Nosu | |
| 6,342,559 B1 * | 1/2002 | Takagishi | 524/492 |
| 6,437,030 B1 * | 8/2002 | Coran et al. | 524/101 |
| 2003/0100647 A1 * | 5/2003 | Parekh et al. | 524/394 |
| 2004/0116592 A1 * | 6/2004 | Durairaj et al. | 524/575.5 |

FOREIGN PATENT DOCUMENTS

| | | |
|---|---|---|
| EP | 0 097 330 B1 | 9/1986 |
| EP | 0 976 783 | 2/2000 |
| WO | WO 97/19130 A1 | 5/1997 |

* cited by examiner

*Primary Examiner*—Vasu Jagannathan
*Assistant Examiner*—Gennadiy Mesh

(57) ABSTRACT

A composition comprising (i) a dynamically-cured rubber, (ii) from about 20 to about 300 parts by weight of a thermoplastic resin per 100 parts by weight rubber, (iii) from 0.2 to 0.9 parts by weight stannous chloride per 100 parts by weight rubber, and (iv) from 0.25 to 4.0 parts by weight metal oxide per 100 parts by weight rubber.

5 Claims, No Drawings

THERMOPLASTIC VULCANIZATES AND PROCESS FOR MAKING THE SAME

FIELD OF THE INVENTION

This invention relates to thermoplastic vulcanizates having an improved balance of properties.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic matrix. These rubber particles are crosslinked to promote elasticity.

Thermoplastic vulcanizates may advantageously be prepared by dynamically vulcanizing a rubber with a phenolic resin while the rubber is being mixed with a thermoplastic resin. U.S. Pat. No. 4,311,628 teaches that thermoplastic vulcanizates that include fully-cured rubber can be produced by using phenolic resin cure systems that include a phenolic curing resin and a cure activator such as stannous chloride. According to this patent, from 5 to 20 parts by weight phenolic resin and 0.1 to 10 parts by weight cure activator, per 100 parts by weight rubber, may be used. Likewise, U.S. Pat. No. 5,952,425 teaches the use of halogen donors in an amount from about 0.01 to 10 parts by weight per 100 parts by weight rubber. Conventionally, the stannous chloride is employed in an excess of 1 part by weight per 100 parts by weight rubber in order to achieve technologically useful products that include fully-cured rubber.

Unfortunately, it is believed that the cure activator significantly contributes to the hygroscopicity of thermoplastic vulcanizates. More specifically, it is believed that the chloride ion associated with the cure activator attracts and absorbs atmospheric moisture. This moisture may impact processing, physical properties, end-product performance, and surface appearance. As a result, moisture pickup control is very important for successful processing. Also, it is often necessary to effectively control the moisture in order to eliminate porosity and obtain good surface finishes and high quality finished parts. Therefore, thermoplastic vulcanizates are typically dried prior to processing. It has also been found that stannous chloride deleteriously impacts the shelf life of thermoplastic vulcanizates as evidenced by the porosity of extrudates that are formed after extended storage of the composition. This porosity is believed to be due to excessive moisture pickup that cannot be alleviated by normal drying procedures, which typically includes about 4 hours at 71° C. within a dryer.

Attempts have been made to reduce the propensity of these thermoplastic vulcanizates to attract and absorb atmospheric moisture. Unfortunately, these attempts have not met with a great degree of success. Where a cure activator such as stannous chloride is completely removed from the system, the ability to fully cure the rubber is precluded as suggested in U.S. Pat. No. 6,143,828. As a result, thermoplastic vulcanizates that exhibit the advantageous properties associated with fully-cured rubber cannot be attained. U.S. Pat. No. 5,952,425 also suggests that cure kinetics are not technologically useful in the absence of stannous chloride. Other attempts to alleviate the problem have included the use of alternate activator systems. For example, U.S. Pat. No. 6,437,030 teaches the use of reduced-halide systems based on metal carboxylates. Unfortunately, these systems tend to have slower cure kinetics and often result in lower cure states. Also, these systems often require preventative measures to compensate for drastic reductions in heat stability that have been observed. As for shelf life, current attempts to minimize the problem have focused on the packaging of the thermoplastic vulcanizates, where special foil liners are often employed. This is not only costly, but also it is not a solution to the problem.

In addition to problems associated with hygroscopicity, thermoplastic vulcanizates prepared with phenolic resin cure systems with a stannous chloride cure activator have exhibited a propensity to plate out, which refers to residue buildup within extrusion dies that can eventually affect engineering tolerances. Therefore, conventional extrusion practices often require routine cleaning of the dies. The prior art has not offered any explanation as to why this plate out occurs and, moreover, has not offered any solution to the problem.

Because phenolic resin cure systems provide significant advantages over other cure systems that may be employed in the production of thermoplastic vulcanizates, there is a continued need to alleviate some of the problems associated with the use of these cure systems in the production of thermoplastic vulcanizates.

SUMMARY OF THE INVENTION

A composition comprising (i) a dynamically-cured rubber, (ii) from about 20 to about 300 parts by weight of a thermoplastic resin per 100 parts by weight rubber, (iii) from 0.2 to 0.9 parts by weight stannous chloride per 100 parts by weight rubber, and (iv) from 0.25 to 4.0 parts by weight metal oxide per 100 parts by weight rubber.

A process for forming a thermoplastic vulcanizate comprising (i) dynamically vulcanizing a rubber within a blend that comprises the rubber and a thermoplastic polymer, where said step of vulcanizing is carried out by using a phenolic resin curative in the presence of 0.2 to 0.9 parts by weight stannous chloride per 100 parts by weight rubber, and at least 0.25 parts by weight metal oxide per 100 parts by weight rubber.

DETAILED DESCRIPTION OF ILLUSTRATIVE EMBODIMENTS

The thermoplastic vulcanizates of this invention have an improved balance of properties. It has unexpectedly been discovered that thermoplastic vulcanizates having at least 0.2 parts by weight stannous chloride, per 100 parts by weight rubber, demonstrate technologically useful heat resistance as compared to those having less stannous chloride. It has also unexpectedly been discovered that thermoplastic vulcanizates having less than 0.9 parts by weight stannous chloride, per 100 parts by weight rubber, show markedly less plate-out as compared to those thermoplastic vulcanizates having more stannous chloride. Within this range, an advantageous cure has unexpectedly been achieved while taking advantage of the improved hygroscopicity resulting from the reduced use of stannous chloride. Also, extruded and molded parts prepared from thermoplastic vulcanizates of certain embodiments of this invention show less porosity after extended storage even without special packaging. In one or more embodiments, the thermoplastic vulcanizates also include from 0.25 to about 4.0 parts by weight metal oxide or acid reducing compound, per 100 parts by weight rubber. It has unexpectedly been discovered that the presence of certain acid reducing compounds (particularly zinc oxide) further stabilizes the heat stability of the thermoplastic vulcanizates when 0.2 to 0.9 parts by weight stannous chloride per 100 parts by weight rubber is employed; while excess amounts of these compounds have unexpectedly been found to have a deleterious impact on the hygroscopicity of the thermoplastic vulcanizates.

Accordingly, the thermoplastic vulcanizates of this invention include a dynamically-cured rubber, a thermoplastic resin, from 0.2 to 0.9 parts by weight stannous chloride per 100 parts by weight rubber, and from 0.25 to 4.0 parts by weight metal oxide per 100 parts by weight rubber. These thermoplastic vulcanizates may optionally include other additives such as, but not limited to, processing additives, fillers, diluents, and acid scavengers. These thermoplastic vulcanizates are manufactured by dynamically curing the rubber with a phenolic resin in the presence of the stannous chloride.

Any rubber or mixture thereof that is capable of being dynamically cured with a phenolic resin in the presence of stannous chloride may be used. Reference to a rubber may include mixtures of more than one rubber. Some non-limiting examples of these rubbers include olefinic elastomeric copolymers, natural rubber, styrene-butadiene copolymer rubber, butadiene rubber, butyl rubber, acrylonitrile rubber, butadiene-styrene-vinyl pyridine rubber, urethane rubber, and polyisoprene rubber.

The term olefinic elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. The preferred a-olefins are propylene, 1-hexene, 1-octene or combinations thereof. The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4cyclohexadiene; dicyclopentadiene; or a combination thereof. The preferred diene monomer is 5-ethylidene-2-norbornene. In the event that the copolymer is prepared from ethylene, α-olefin, and diene monomers, the copolymer may be referred to as a terpolymer or even a tetrapolymer in the event that multiple α-olefins or dienes are used.

The preferred olefinic elastomeric copolymers include from about 45 to about 85% by weight, more preferably from about 55 to about 75% by weight, still more preferably from about 60 to about 70% by weight, and even more preferably from about 61 to about 66% by weight ethylene units deriving from ethylene monomer, and from about 0.1 to about 15% by weight, more preferably from about 0.5 to about 12% by weight, still more preferably from about 1 to about 10% by weight, and even more preferably from about 2 to about 8% by weight diene units deriving from diene monomer, with the balance including α-olefin units (preferably propylene) deriving from α-olefin monomer. Expressed in mole percent, the preferred terpolymer preferably includes from about 0.1 to about 5 mole percent, more preferably from about 0.5 to about 4 mole percent, and even more preferably from about 1 to about 2.5 mole percent diene units deriving from diene monomer.

The preferred olefinic elastomeric copolymers have a weight average molecular weight ($M_w$) that is preferably greater than 50,000, more preferably greater than 100,000, even more preferably greater than 200,000, and still more preferably greater than 300,000; and the weight average molecular weight of the preferred olefinic elastomeric copolymers is preferably less than 1,200,000, more preferably less than 1,000,000, still more preferably less than 900,000, and even more preferably less than 800,000. The preferred olefinic elastomeric copolymers have a number average molecular weight ($M_n$) that is preferably greater than 20,000, more preferably greater than 60,000, even more preferably greater than 100,000, and still more preferably greater than 150,000; and the number average molecular weight of the preferred olefinic elastomeric copolymers is preferably less than 500,000, more preferably less than 400,000, still more preferably less than 300,000, and even more preferably less than 250,000.

The preferred olefinic elastomeric copolymers may also be characterized by having a Mooney viscosity ($ML_{(1+4)}$ at 125° C.) per ASTM D 1646, of from about 50 to about 500 and preferably from about 75 to about 450. Where higher molecular weight olefinic elastomeric copolymers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers is from about 45 to about 80 and preferably from about 50 to about 70.

Useful olefinic elastomeric copolymers may be manufactured or synthesized by using a variety of techniques. For example, these copolymers can be synthesized by employing solution, slurry, or gas phase polymerization techniques that employ numerous catalyst systems including Ziegler-Natta systems, single-site catalysts, and Brookhart catalysts.

Olefinic elastomeric copolymers are commercially available under the tradenames Vistalon™ (ExxonMobil Chemical Co.; Houston, Tex.), Vistamaxx™ (ExxonMobil Chemical Co.), Keltan™ (DSM Copolymers; Baton Rouge, La.), Nordel™ IP (DuPont Dow Elastomers; Del.), NORDEL MG™ (DuPont Dow Elastomers), and Buna™ (Bayer Corp.; Germany).

The preferred butyl rubber includes copolymers of isobutylene and isoprene, copolymers of isobutylene and paramethyl styrene, as described in U.S. Pat. No. 5,013,793, which is incorporated herein by reference, terpolymers of isobutylene, isoprene, and divinyl styrene, as described in U.S. Pat. No. 4,916,180, which is incorporated herein by reference, and star branched butyl rubber, as described in U.S. Pat. No. 6,255,389, which is incorporated herein by reference. These preferred copolymers and terpolymers may be halogenated.

In the case of the isobutylene-isoprene copolymer, the copolymer preferably includes from about 0.5 to about 30, and more preferably from about 0.8 to about 5, percent by weight isoprene based on the entire weight of the copolymer with the remainder being isobutylene.

In the case of the isobutylene-paramethyl styrene copolymer, the copolymer preferably includes from about 0.5 to about 25, and more preferably from about 2 to about 20, percent by weight paramethyl styrene based on the entire weight of the copolymer with the remainder being isobutylene. The isobutylene-paramethyl styrene copolymers are preferably halogenated, especially with bromine, and these halogenated copolymers preferably contain from about 0 to about 10 percent by weight, and more preferably from about 0.3 to about 7 percent by weight halogenation.

The preferred isobutylene-isoprene-divinyl styrene terpolymer preferably includes from about 95 to about 99, and even more preferably from about 96 to about 98.5, percent by weight isobutylene, and from about 0.5 to about 5, and even more preferably from about 0.8 to about 2.5, percent by weight isoprene based on the entire weight of the terpolymer, with the balance being divinyl styrene.

Any thermoplastic resin that can be employed in the manufacture of thermoplastic vulcanizates can be used to manufacture the thermoplastic vulcanizates of this invention. Useful thermoplastic resins include solid, generally high molecular weight plastic resins. These resins include crystalline and semi-crystalline polymers including those having a crystallinity of at least 25% as measured by differential scanning calorimetry. Selection of particular resins preferably includes those that have a melt temperature lower than the decomposition temperature of the rubber selected.

Useful thermoplastic resins preferably have a weight average molecular weight from about 200,000 to about 600,000, and a number average molecular weight from about 80,000 to about 200,000. More preferably, these resins have a weight average molecular weight from about 300,000 to about 500,000, and a number average molecular weight from about 90,000 to about 150,000.

Useful thermoplastic resins preferably have a melt temperature ($T_m$) that is preferably from about 150 to about 175° C., preferably from about 155 to about 170° C., and even more preferably from about 160 to about 170° C. The glass transition temperature ($T_g$) of these resins is preferably less than about 10° C., preferably less than about 5° C., more preferably less than about 3° C., and most preferably in the range from −5° C. to about 5° C. The crystallization temperature ($T_c$) of these resins is preferably greater than 95° C., more preferably greater than 100° C., and even more preferably greater than 110° C., with the preferred range being from 105 to about 110° C. as measured by DSC at 10° C./min. Preferably, the linear thermoplastic resins have a melt flow rate that is less than about 10 dg/min, preferably less than about 2 dg/min, still more preferably less than about 1.0 dg/min, and even more preferably less than about 0.5 dg/min.

Exemplary thermoplastic resins include crystalline and crystallizable polyolefins, polyimides, polyesters (nylons), and fluorine-containing thermoplastics. Also, the thermoplastic resins may include copolymers of polyolefins with styrene such as styrene-ethylene copolymer. The preferred thermoplastic resins are crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers will typically be from 1 to about 30% by weight of the polymer. Blends or mixtures of 2 or more polyolefin thermoplastics such as described herein, or with other polymeric modifiers, are also suitable in accordance with this invention. These homopolymers and copolymers may be synthesized by using any polymerization technique known in the art such as, but not limited to, the Phillips-catalyzed reactions, conventional Ziegler-Natta type polymerizations, and catalysis employing single-site organometallic catalysts including, but not limited to, metallocene catalysts.

An especially preferred linear thermoplastic resin is a high-crystallinity isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 10 dg/min, more preferably less than or equal to 1.0 dg/min, and even more preferably less than or equal to 0.5 dg/min per ASTM D-1238.

Any phenolic resin, or mixture thereof, that is capable of crosslinking a rubber polymer can be employed in practicing the present invention. Phenolic resins include those disclosed in U.S. Pat. Nos. 2,972,600, 3,287,440, 5,952,425 and 6,437,030, which are incorporated herein by reference.

The preferred phenolic resin curatives can be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend includes from about 25 to about 40% by weight octyl phenol and from about 75 to about 60% by weight nonylphenol, more preferably, the blend includes from about 30 to about 35 weight percent octyl phenol and from about 70 to about 65 weight percent nonylphenol. In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Exemplary phenolic resins that are useful in the practice of the present invention may be obtained under the tradenames SP-1044, SP-1045 (Schenectady International; Schenectady, N.Y.), which are referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a preferred phenolic resin curative is defined according to the general formula

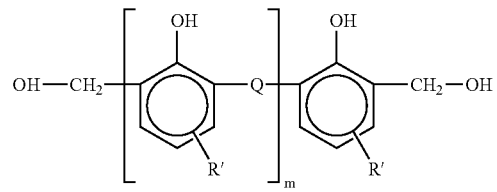

where Q is a divalent radical selected from the group consisting of —$CH_2$—, —$CH_2$—O—$CH_2$—; m is zero or a positive integer from 1 to 20 and R' is an organic group. Preferably, Q is the divalent radical —$CH_2$—O—$CH_2$—, m is zero or a positive integer from 1 to 10, and R' is an organic group having less than 20 carbon atoms. Still more preferably, m is zero or a positive integer from 1 to 5 and R' is an organic radical having between 4 and 12 carbon atoms.

The stannous chloride can be used in its hydrous ($SnCl_2.H_2O$) or anhydrous ($SnCl_2$) form. The stannous chloride can be used in a powdered, granulated, or flake form. The preferred metal oxide or acid reducing compound is zinc oxide. In preferred embodiments, the stannous chloride is employed, preferably in combination with zinc oxide, as the exclusive heat stability agent, and the thermoplastic vulcanizates of this invention are devoid of other heat stability agents or antioxidants.

Plasticizers, extender oils, synthetic processing oils, or a combination thereof may optionally be included, which may be referred to collectively as oils. The oils may include, but are not limited to, aromatic, naphthenic, and paraffinic (including isoparaffinic) extender oils. Exemplary synthetic processing oils are polylinear α-olefins, polybranched α-olefins, and hydrogenated polyalphaolefins. The compositions of this invention may include organic esters, alkyl ethers, or combinations thereof. U.S. Pat. Nos. 5,290,886, 5,397,832, and 6,326,426 are incorporated herein in this regard. The addition of certain low to medium molecular weight polyalphaolefins, organic esters and alkyl ether esters to the compositions of the invention dramatically lowers the Tg of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e. that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective. Synthetic polyalphaolefins (e.g., SHF-61™ or SPECTRASYN™ (ExxonMobil)), hydrogenated polyolefins or isoparaffins are also useful in lowering $T_g$. See also, M. D. Ellul "Plasticization of Polyolefin Elastomers, Semicrystalline Plastics and Blends Crosslinked in-situ During Melt Mixing," RUBBER CHEMISTRY AND TECHNOLOGY, Vol. 71, pp. 244-276 (1998).

In certain embodiments of this invention, a polymeric processing additive may be added. The processing additive may be a polymeric resin that has a very high melt flow index. These polymeric resins include both linear and branched molecules that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

In addition to the thermoplastic resins, rubber, curatives and optional extender oils, the compositions of the invention may also include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In certain embodiments, the thermoplastic vulcanizates may include acid scavengers. These acid scavengers are preferably added to the thermoplastic vulcanizates after the desired level of cure has been achieved. Preferably, the acid scavengers are added after dynamic vulcanization. Useful acid scavengers include hydrotalcite. Both synthetic and natural hydrotalcites can be used. An exemplary natural hydrotalcite can be represented by the formula $Mg_6Al_2(OH)_{16}CO_3.4H_2O$. Synthetic hydrotalcite compounds, which are believed to have the formula $Mg_{4.3}Al_2(OH)_{12.6}CO_3.mH_2O$ or $Mg_{4.5}Al_2(OH)_{13}CO_3.3.5H_2O$, can be obtained under the tradenames DHT-4A™ or Kyowaad™ 1000 (Kyowa; Japan). Another commercial example is that available under the tradename Alcamizer™ (Kyowa).

Preferably, compositions of this invention will contain a sufficient amount of the rubber to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the thermoplastic elastomers of the present invention should comprise at least about 25 percent by weight, preferably at least about 35 percent by weight, even more preferably at least about 45 percent by weight, and still more preferably at least about 50 percent by weight rubber. More specifically, the amount of rubber within the thermoplastic vulcanizate is generally from about 25 to about 90 percent by weight, preferably from about 45 to about 85 percent by weight, and more preferably from about 60 to about 80 percent by weight, based on the entire weight of the rubber and thermoplastic component combined.

The thermoplastic elastomers generally include from about 20 to about 300 parts by weight, preferably from about 30 to about 250 parts by weight, and more preferably from about 40 to about 200 parts by weight thermoplastic resin per 100 parts by weight rubber.

When employed, the polymeric processing additives may be employed in an amount from about 0.5 to about 20 parts by weight, preferably from about 1 to about 10 parts by weight, and more preferably from about 2 to about 6 parts by weight of a polymeric processing additive per 100 parts by weight rubber.

Fillers, such as carbon black or clay, may be added in amount from about 10 to about 250, per 100 parts by weight of rubber. The amount of carbon black that can be used depends, at least in part, upon the type of carbon black and the amount of extender oil that is used.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired.

The phenolic resin is preferably employed in an amount equal to or in excess of 2, more preferably in excess of 3, even more preferably in excess of 3.5, still more preferably in excess of 4.0, even more preferably in excess of 4.5, and still more preferably in excess of 5 parts by weight per 100 parts by weight rubber; and the phenolic resin is preferably employed in an amount less than 10, preferably less than 9, more preferably less than 7.5, even more preferably less than 6.5, still more preferably less than 6.0, and even more preferably less than 5.5 parts by weight per 100 parts by weight rubber.

The stannous chloride is preferably employed in an amount equal to or in excess of 0.2, more preferably equal to or in excess of 0.25, even more preferably equal to or in excess of 0.3, still more preferably equal to or in excess of 0.4, and even more preferably equal to or in excess of 0.5 parts by weight per 100 parts by weight rubber; and the stannous chloride is preferably employed in an amount equal to or less than 0.9, preferably equal to or less than 0.85, more preferably equal to or less than 0.8, still more preferably equal to or less than 0.75, and even more preferably equal to or less than 0.7 parts by weight per 100 parts by weight rubber. Alternatively, the thermoplastic vulcanizates of this invention may include from 0.2 to 0.9, optionally from about 0.25 to about 0.85, and optionally from about 0.3 to about 0.8 parts by weight stannous chloride per 100 parts by weight rubber.

The zinc oxide is preferably employed in an amount equal to or in excess of 0.25, preferably equal to or in excess of 0.3, even more preferably equal to or in excess of 0.5, still more preferably in excess of 0.8, and even more preferably equal to or in excess of 1.0 parts by weight per 100 parts by weight rubber; and the zinc oxide is preferably employed in an amount equal to or less than 4.0, preferably equal to or less than 3.0, and more preferably equal to or less than 2.0, parts by weight per 100 parts by weight rubber. Alternatively, the thermoplastic vulcanizates of this invention may include from 0.25 to 4.0, optionally from about 0.3 to about 3.0, and optionally from about 0.5 to about 2.0 parts by weight zinc oxide per 100 parts by weight rubber.

When employed, acid scavengers, such as hydrotalcite, may be employed in an amount from about 0.1 to about 5% by weight, preferably from about 0.2 to about 3% by weight, and more preferably from about 0.5 to about 1.0% by weight based on the total weight of the thermoplastic vulcanizate.

When employed, processing or extender oils may be employed in an amount from about 5 to about 300 parts by weight, preferably from about 30 to about 250 parts by weight, and more preferably from about 70 to about 200 parts by weight extender oil per 100 parts by weight rubber. The quantity of the extender oil depends upon the properties desired, with the upper limit depending upon the compatibility of the particular oil and the blended ingredients; this limit is exceeded when excessive exuding of extender oil occurs. High viscosity rubbers are more highly oil extendable.

The thermoplastic vulcanizates are preferably prepared by employing dynamic vulcanization techniques. Dynamic vulcanization refers to a vulcanization or curing process for a rubber contained in a blend that includes the rubber and at least one thermoplastic resin. The rubber is vulcanized under conditions of shear and extension at a temperature at or above the melting point of the thermoplastic resin. The rubber is thus simultaneously crosslinked and dispersed (preferably as fine particles) within the thermoplastic resin matrix, although other morphologies, such as co-continuous morphologies, may exist depending on the degree of cure, the rubber to plastic viscosity ratio, the intensity of mixing, the residence time, and the temperature. Where the rubber is dynamically vulcanized with the phenolic resin system, the stannous chloride and zinc oxide are preferably present during the dynamic vulcanization in the advantageous amounts provided for in this invention.

In one embodiment, the dynamic vulcanization of the rubber is carried out by employing a phenolic resin in the presence of the stannous chloride within a continuous process that undergoes relatively high shear as defined in U.S. Pat. No. 4,594,390, which is incorporated herein by reference. In particularly preferred embodiments, the mixing intensity and residence time experienced by the ingredients during dynamic vulcanization is preferably greater than that proposed in U.S. Pat. No. 4,594,390. Dynamic vulcanization may occur within a variety of mixing equipment including batch mixers such as Brabender mixers and continuous mixers such as multiple-screw extruders. The various equipment that can be employed includes those described in "Mixing Practices Incorporating Twin-Screw Extruders," by Andersen, and "Intermeshing Twin-Screw Extruders" by Sakai, Chapters 20 and 21, MIXING AND COMPOUNDING OF POLYMERS: THEORY AND PRACTICE by Ica Manas-Zloczower and Zebev Tadmor, New York: Hanser, (1994), which is incorporated herein by reference.

In certain embodiments, certain ingredients are added after dynamic vulcanization or after phase inversion. As those skilled in the art appreciate, dynamic vulcanization may begin by including a greater volume fraction of rubber than thermoplastic resin. As such, the thermoplastic resin may be present as the discontinuous phase when the rubber volume fraction is greater than that of the volume fraction of the thermoplastic resin. As dynamic vulcanization proceeds, the viscosity of the rubber increases and phase inversion occurs under dynamic mixing. In other words, the thermoplastic resin phase becomes continuous.

In one embodiment, the acid scavengers (e.g., hydrotalcite) are added after about 50%, preferably 75%, and more preferably about 90% of the curative is consumed. In preferred embodiments, the acid scavengers are added after the curative is completely consumed or full cure, where applicable, has been achieved. In one embodiment, the acid scavenger can be added with a carrier. For example, the acid scavenger can be blended with an oil or with a thermoplastic resin such as polypropylene and the mixture added to the thermoplastic vulcanizate.

Other ingredients, such as additional thermoplastic resins, processing additives, or pigments, may likewise be added after dynamic vulcanization or phase inversion.

The addition of additional ingredients after dynamic vulcanization can be accomplished by employing a variety of techniques. In one embodiment, the additional ingredients can be added while the thermoplastic vulcanizate remains in its molten state from the dynamic vulcanization process. For example, the additional ingredients can be added downstream of the location of dynamic vulcanization within a process that employs continuous processing equipment such as a single or twin screw extruder. In other embodiments, the thermoplastic vulcanizate can be "worked-up" or pelletized, subsequently melted, and the additional ingredients can be added to the molten thermoplastic vulcanizate product. This latter process may be referred to as a "second pass" addition of the ingredients.

Despite the fact that the rubber may be partially or fully cured, the compositions of this invention can be processed and reprocessed by conventional plastic processing techniques such as extrusion, injection molding, and compression molding. The rubber within these thermoplastic elastomers is usually in the form of finely-divided and well-dispersed particles of vulcanized or cured rubber within a continuous thermoplastic phase or matrix, although a co-continuous morphology or a phase inversion is also possible. In those embodiments where the cured rubber is in the form of finely-divided and well-dispersed particles within the thermoplastic medium, the rubber particles typically have an average diameter that is less than 50 μm, preferably less than 30 μm, even more preferably less than 10 μm, still more preferably less than 5 μm and even more preferably less than 1 μm. In preferred embodiments, at least 50%, more preferably at least 60%, and even more preferably at least 75% of the particles have an average diameter of less than 5 μm, more preferably less than 2 μm, and even more preferably less than 1 μm.

In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628. Preferably, the rubber has a degree of cure where not more than 15 weight percent, preferably not more than 10 weight percent, more preferably not more than 5 weight percent, and still more preferably not more than 3 weight percent is extractable by cyclohexane at 23° C. as described in U.S Pat. Nos. 5,100,947 and 5,157,081, which are incorporated herein by reference. Alternatively, the rubber has a degree of cure such that the crosslink density is preferably at least $4 \times 10^{-5}$, more preferably at least $7 \times 10^{-5}$, and still more preferably at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol 68, pp. 573-584 (1995).

In certain embodiments, the thermoplastic vulcanizates are also characterized by having improved heat stability. In general, this heat stability is evidenced by advantageous mechanical properties after heat aging. For example, the thermoplastic vulcanizates of certain embodiments of this invention demonstrate an elongation retention in excess of 50%, preferably in excess of 60%, and even more preferably in excess of 80% after heat aging at 125° C. for six weeks or at 150° C. for one week. Likewise, the thermoplastic vulcanizates of certain embodiments of this invention advantageously demonstrated tensile strength retention in excess of 50%, preferably in excess of 60%, and even more preferably in excess of 80% after heat aging at 125° C. for six weeks or at 150° C. for one week.

In certain embodiments, the thermoplastic vulcanizates advantageously demonstrate relatively low hygroscopicity. In general, this low hygroscopicity is evidenced by an advantageously low water uptake. For example, the thermoplastic vulcanizates of certain embodiments are characterized by a moisture uptake of less than 0.3 weight %, preferably less than 0.2 weight %, and even more preferably less than 0.1 weight % as determined gravimetrically after 8 weeks at 81% relative humidity and 25° C.

In certain embodiments, the thermoplastic vulcanizates advantageously provide extrudates that are characterized by low porosity, even after extended storage periods. For example, the thermoplastic vulcanizates of certain embodiments can be stored under normal conditions for an excess of 12 months and, followed by conventional drying for 16 hours at 71° C., and provide extrudates that are characterized by no more than 50%, advantageously no more than 30%, more advantageously no more than 20%, and even more advantageously no more than 10% increase in surface roughness as compared to thermoplastic vulcanizates that have not been aged. As those skilled in the art will appreciate, extrusion surface roughness can be measured as described by Ellul et al., "Chemical Surface Treatments Of Natural Rubber And EPDM Thermoplastic Elastomers: Effects On Friction And Adhesion," RUBBER CHEMISTRY AND TECHNOLOGY, Vol. 67, No. 4 pg. 582, (1994).

In order to demonstrate the practice of the present invention, the following examples have been prepared and tested. The examples should not, however, be viewed as limiting the scope of the invention. The claims will serve to define the invention.

EXAMPLES

Samples 1-16

Sixteen thermoplastic vulcanizates (TPV) were prepared by dynamically vulcanizing an elastomeric copolymer with a phenolic resin in the presence of various amounts of stannous chloride and zinc oxide.

The thermoplastic vulcanizates of Samples 1-16 were prepared by employing conventional techniques within a Brabender mixer. The following ingredients were used in each sample. The ingredients included 175 parts by weight of an oil-extended olefinic elastomeric copolymer (this amount includes 100 parts by weight rubber and 75 parts by weight oil), 50 parts by weight thermoplastic polypropylene homopolymer, 130 total parts by weight paraffinic oil (130 parts including the 75 parts inclusive with the rubber), 42 parts by weight clay, and 3.4 part by weight wax, and 4.5 parts by weight phenolic resin, each based on 100 parts by weight of the elastomeric copolymer.

The elastomeric copolymer was poly(ethylene-co-propylene-co-5-ethylidene-2-norbornene) obtained under the tradename VISTALON™ 3666 (ExxonMobil), the thermoplastic polypropylene homopolymer was obtained under the tradename EQUISTAR 5107A, and the phenolic resin was obtained under the tradename SP-1045. The amount of stannous chloride and zinc oxide employed in each sample is set forth in Table I along with the results of testing that was performed on each thermoplastic vulcanizate. The thermoplastic vulcanizates that are comparative samples have been designated with the letter "C" and those that are within the invention have been labelled with the letter "I." The amounts provided in Table I, as well as the other tables in this specification, are provided in parts by weight per 100 parts by weight rubber (phr) unless otherwise specified.

TABLE I

| | Samples | | | | | | | |
|---|---|---|---|---|---|---|---|---|
| | 1 | 2 | 3 | 4 | 5 | 6 | 7 | 8 |
| Comparative/Inventive | C | I | I | C | C | I | I | C |
| Zinc Oxide (phr) | 2 | 2 | 2 | 2 | 1 | 1 | 1 | 1 |
| SnCl$_2$ (phr) | 1.2 | 0.6 | 0.3 | 0 | 1.2 | 0.6 | 0.3 | 0 |

TABLE I-continued

| | Properties | | | | | | | |
|---|---|---|---|---|---|---|---|---|
| Tension Set (%) | 5.5 | 6 | 9 | 25 | 6 | 6.5 | 9 | 19 |
| Weight Gain (%) | 78 | 92 | 109 | 260 | 77 | 95 | 117 | 258 |
| % moisture gain (8 weeks) | 0.181 | 0.119 | 0.084 | 0.042 | 0.212 | 0.120 | 0.082 | 0.046 |
| | Accelerated Heat Aging | | | | | | | |
| Original Shore A | 64 | 61 | 61 | 54 | 62 | 62 | 61 | 54 |
| Aged Shore A | 68 | 67 | 65 | 52 | 65 | 65 | 62 | 65 |
| Points change | 4 | 6 | 4 | −2 | 3 | 3 | 1 | 11 |
| Original UTS(MPa) | 5.92 | 5.78 | 5.33 | 2.68 | 7.31 | 7.23 | 5.53 | 3.31 |
| Aged UTS (MPa) | 7.34 | 6.83 | 5.24 | 1.15 | 7.15 | 4.94 | 3.93 | 2.02 |
| % change | 19 | 15 | −2 | −57 | −2 | −46 | −41 | −39 |
| Original elongation (%) | 268 | 331 | 336 | 553 | 349 | 395 | 365 | 599 |
| Aged elongation | 326 | 399 | 365 | 1 | 352 | 291 | 281 | 2 |
| % change | 18 | 17 | 8 | −100 | 1 | −36 | −30 | −100 |
| Original M100(MPa) | 3.21 | 2.79 | 2.55 | 1.60 | 3.18 | 3.09 | 2.63 | 1.72 |
| Aged M100 (MPa) | 3.38 | 2.96 | 2.59 | 0.00 | 2.99 | 2.70 | 2.33 | 0.00 |
| % change | 5 | 6 | 1 | −100 | −6 | −15 | −13 | −100 |

| | Samples | | | | | | | |
|---|---|---|---|---|---|---|---|---|
| | 9 | 10 | 11 | 12 | 13 | 14 | 15 | 16 |
| Comparative/Inventive | C | C | C | C | C | I | I | C |
| Zinc Oxide (phr) | 0 | 0 | 0 | 0 | 4 | 4 | 4 | 4 |
| SnCl$_2$ (phr) | 1.2 | 0.6 | 0.3 | 0 | 1.2 | 0.6 | 0.3 | 0 |
| | Properties | | | | | | | |
| Tension Set (%) | 6 | 8 | 13 | 22 | 6 | 6 | 8 | 20 |
| Weight Gain (%) | 91 | 113 | 182 | 266 | 75 | 88 | 112 | 268 |
| % moisture gain (8 weeks) | 0.262 | 0.191 | 0.116 | 0.062 | 0.202 | 0.137 | 0.102 | 0.065 |
| | Accelerated Heat Aging | | | | | | | |
| Original Shore A | 61 | 60 | 57 | 64 | 64 | 63 | 61 | 56 |
| Aged Shore A | 60 | 56 | 51 | 67 | 66 | 65 | 63 | 55 |
| Points change | −1 | −4 | −6 | 3 | 2 | 2 | 2 | −1 |
| Original UTS(MPa) | 5.39 | 6.08 | 4.23 | 2.65 | 7.09 | 6.65 | 6.30 | 3.25 |
| Aged UTS (MPa) | 3.23 | 1.65 | 0.93 | 1.76 | 7.55 | 6.18 | 4.15 | 0.82 |
| % change | −40 | −73 | −78 | −50 | 6 | −8 | −52 | −75 |
| Original elongation (%) | 298 | 388 | 401 | 483 | 324 | 380 | 440 | 519 |
| Aged elongation | 140 | 63 | 5 | 3 | 350 | 370 | 286 | 2 |
| % change | −53 | −84 | −99 | −99 | 7 | −3 | −54 | −100 |
| Original M100(MPa) | 2.81 | 2.39 | 2.03 | 1.68 | 3.26 | 2.87 | 2.55 | 1.87 |
| Aged M100 (MPa) | 2.69 | 0.00 | 0.00 | 0.00 | 3.19 | 2.83 | 2.37 | 0.00 |
| % change | −4 | −100 | −100 | −100 | −2 | −1 | −8 | −100 |

Shore hardness was determined according to ASTM D-2240. Ultimate tensile strength, ultimate elongation, and 100% modulus were determined according to ASTM D-412 at 23° C. by using an Instron testing machine. Weight gain was determined according to ASTM D-471. Tension set was determined according to ASTM D-142. Moisture gain was determined gravimetrically after exposure to 81% relative humidity at 25° C. Accelerated heat ageing involved exposing samples to 150° C. for 168 hours. Standard heat aging involved exposure to 125° C. for 1,000 hours.

The data in Table I suggests that the moisture uptake of those thermoplastic vulcanizates that include 1.2 parts by weight stannous chloride per 100 parts by weight rubber is relatively high. The data also suggests that the absence of stannous chloride dramatically and deleteriously impacts the heat stability properties of the thermoplastic vulcanizates. Likewise, the absence of zinc oxide deleteriously and dramatically impacts the heat stability of the thermoplastic vulcanizates. On the other hand, the TPVs that include 0.3 or 0.6 phr stannous chloride together with zinc oxide unexpectedly demonstrate a technologically useful balance of properties. Also, upon visual inspection of dies that were used to extrude these compositions, plate-out was noticeably higher in those compositions that include 1.26 phr stannous chloride as opposed to those compositions that included less stannous chloride.

Samples 17-25

Nine additional thermoplastic vulcanizates were prepared by employing ingredients and procedures similar to Samples 1-16 except that 6 parts by weight phenolic resin per 100 rubber was employed. The amount of zinc oxide and stannous chloride, as well as the results of physical testing, are set forth in Table II.

TABLE II

| | Samples | | | | | | | | |
|---|---|---|---|---|---|---|---|---|---|
| | 17 | 18 | 19 | 20 | 21 | 22 | 23 | 24 | 25 |
| Comparative/Inventive | C | C | C | I | I | C | C | I | I |
| Zinc Oxide (phr) | 2 | 2 | 2 | 2 | 2 | 1 | 1 | 1 | 1 |
| SnCl$_2$ (phr) | 1.2 | 1.2 | 0 | 0.6 | 0.25 | 1.2 | 1.2 | 0.6 | 0.25 |

TABLE II-continued

| | Samples | | | | | | | | |
|---|---|---|---|---|---|---|---|---|---|
| | 17 | 18 | 19 | 20 | 21 | 22 | 23 | 24 | 25 |
| Properties | | | | | | | | | |
| Tension Set (%) | 6 | 6 | 12 | 6 | 6 | 8 | 6 | 8 | 7 |
| Weight Gain (%) | 73 | 71 | 235 | 80 | 98 | 74 | 75 | 83 | 106 |
| % moisture gain (8 weeks) | — | 0.293 | .061 | 0.238 | 0.140 | 0.301 | 0.305 | 0.205 | 0.105 |
| Accelerated Heat Aging | | | | | | | | | |
| Original Shore A | 62 | 63 | 52 | 62 | 62 | 64 | 62 | 64 | 59 |
| Aged Shore A | 66 | 68 | 62 | 66 | 63 | 67 | 59 | 66 | 61 |
| Points change | 4 | 5 | 10 | 4 | 1 | 3 | −3 | 2 | 2 |
| Original UTS (MPa) | 6.28 | 5.39 | 4.30 | 6.23 | 6.17 | 7.24 | 6.96 | 6.33 | 6.58 |
| Aged UTS after (MPa) | 5.82 | 7.97 | 0.73 | 5.62 | 5.80 | 7.34 | 6.35 | 7.01 | 5.29 |
| % change | −7 | 48 | −83 | −10 | −6 | 1 | −9 | 11 | −20 |
| Original Elongation (%) | 236 | 272 | 568 | 335 | 369 | 306 | 317 | 336 | 373 |
| Aged Elongation | 257 | 323 | 0 | 264 | 363 | 311 | 310 | 341 | 326 |
| % change | 9 | 19 | −100 | −21 | −2 | 2 | −2 | 1 | −13 |
| Original M100(MPa) | 3.65 | 2.83 | 1.93 | 2.88 | 2.69 | 3.36 | 3.30 | 2.95 | 2.95 |
| Aged M100 (MPa) | 3.29 | 3.89 | 0 | 2.99 | 2.63 | 3.37 | 3.01 | 3.11 | 2.69 |
| % change | −9.8 | 37.3 | −100 | 3.7 | −2.5 | 0.5 | −9 | 5.7 | −9 |

The data in Table II shows that an increase in the use of phenolic resin, which may be desirable to increase the cure state, has minimal impact on the advantageous properties of the invention. Notably, the balance of properties observed within the inventive ranges of stannous chloride and zinc oxide are observed even with the use of increased phenolic resin.

Samples 26-33

Eight additional thermoplastic vulcanizates were prepared using the recipe set forth below and a multiple-screw extruder that is similar to that described in U.S. Pat. No. 4,594,390. Also, in some examples, a hydrotalcite, which is designated Hydrotalcite No. 1 and was obtained under the tradename DHT-4A™, was added after the thermoplastic vulcanizate product was pelletized and re-melted within a mixer.

Specifically, the following ingredients were used in each sample. The ingredients included 175 parts by weight of an oil-extended olefinic elastomeric copolymer (this amount includes 100 parts by weight rubber and 75 parts by weight oil), 37 parts by weight thermoplastic polypropylene homopolymer, 135 total parts by weight paraffinic oil (135 parts including the 75 parts inclusive with the rubber), 42 parts by weight clay, 3.4 parts by weight wax, 4.4 parts by weight phenolic resin, 1.94 parts by weight zinc oxide, and 24 parts by weight carbon black/polypropylene concentrate (9.6 parts carbon black and 14.4 parts polypropylene) each based on 100 parts by weight of the elastomeric copolymer. The carbon black/polypropylene blend was obtained under the tradename Ampacet 49974™ (Ampacet).

TABLE III

| | Samples | | | | | | | |
|---|---|---|---|---|---|---|---|---|
| | 26 | 27 | 28 | 29 | 30 | 31 | 32 | 33 |
| Comparative/Inventive | C | C | C | C | I | I | I | I |
| SnCl$_2$ (phr) | 1.26 | 1.26 | 1.26 | 1.26 | 0.58 | 0.58 | 0.58 | 0.58 |
| Hydrotalcite No. 1 (% by weight of TPV) | — | 0.25 | 0.50 | 1.00 | — | 0.25 | 0.50 | 1.00 |
| ESR | 37 | 38 | 37 | 35 | 36 | 35 | 32 | 35 |
| Spots | 12 | 8 | 6 | 12 | 8 | 6 | 10 | 10 |
| Properties | | | | | | | | |
| Weight Gain (%) | 82 | 82 | 82 | 82 | 79 | 79 | 84 | 85 |
| Tension Set (%) | 10 | 9.5 | 10 | 10 | 10 | 8 | 11 | 10 |
| % moisture gain (8 weeks) | 0.335 | 0.282 | 0.249 | 0.219 | 0.291 | 0.255 | 0.192 | 0.206 |
| Accelerated Heat Aging | | | | | | | | |
| Original Shore A | 69 | 68 | 68 | 69 | 69 | 69 | 69 | 69 |
| Aged Shore A | 68 | 67 | 66 | 69 | 69 | 67 | 66 | 67 |
| Points change | −1 | −1 | −2 | 0 | 0 | −2 | −3 | −2 |
| Original UTS (MPa) | 6.66 | 7.39 | 7.20 | 7.19 | 6.64 | 6.61 | 7.16 | 7.17 |
| Aged UTS (MPa) | 6.50 | 6.76 | 5.98 | 4.99 | 7.49 | 6.15 | 5.36 | 4.97 |
| % change | −2 | −9 | −17 | −31 | 13 | −7 | −25 | −31 |
| Original Ultimate Elongation % | 417 | 460 | 446 | 444 | 404 | 399 | 459 | 475 |
| Aged elongation | 447 | 458 | 383 | 305 | 456 | 406 | 360 | 334 |
| % change | 7 | 0 | −14 | −31 | 13 | 2 | −22 | −30 |
| Original M100 (MPa) | 2.64 | 2.62 | 2.61 | 2.69 | 2.63 | 2.69 | 2.64 | 2.57 |
| Aged M100 (MPa) | 2.76 | 2.76 | 2.76 | 2.82 | 3.00 | 2.86 | 2.73 | 2.73 |
| % change | 4.6 | 5.5 | 5.7 | 4.8 | 14.1 | 6.3 | 3.2 | 6.0 |

TABLE III-continued

|  | Samples | | | | | | | |
| --- | --- | --- | --- | --- | --- | --- | --- | --- |
|  | 26 | 27 | 28 | 29 | 30 | 31 | 32 | 33 |
|  | Standard Heat Aging | | | | | | | |
| Original Shore A Hardness | 69 | 68 | 68 | 69 | 69 | 69 | 69 | 69 |
| Aged Shore A | 66 | 65 | 67 | 68 | 68 | 69 | 66 | 66 |
| Points change | −3 | −3 | −1 | −1 | −1 | 0 | −3 | −3 |
| Original UTS (MPa) | 6.66 | 7.39 | 7.20 | 7.19 | 6.64 | 6.61 | 7.16 | 7.17 |
| Aged UTS (MPa) | 7.36 | 7.63 | 7.17 | 6.48 | 7.49 | 7.49 | 6.18 | 5.06 |
| % change | 11 | 3 | 0 | −10 | 13 | 13 | −14 | −29 |
| Original Ultimate Elongation (%) | 417 | 460 | 446 | 444 | 404 | 399 | 459 | 475 |
| Aged elongation | 462 | 459 | 439 | 386 | 456 | 450 | 409 | 312 |
| % change | 11 | 0 | −2 | −13 | 13 | 13 | −11 | −34 |
| Original M100 (MPa) | 2.64 | 2.62 | 2.61 | 2.69 | 2.63 | 2.69 | 2.64 | 2.57 |
| Aged M100 (MPa) | 2.92 | 2.97 | 2.90 | 2.96 | 3.00 | 3.01 | 2.94 | 2.83 |
| % change | 10.4 | 13.7 | 11.2 | 10.0 | 14.1 | 11.9 | 11.2 | 10.2 |

The data in Table III shows that the addition of hydrotalcite further reduces the moisture uptake of the thermoplastic vulcanizates of this invention, although heat stability can be compromised at excessive levels of the hydrotalcite.

Samples 34-40

Seven additional thermoplastic vulcanizates were prepared using similar recipes and procedures set forth in Samples 26-33, except a slight recipe change was employed. The amount of stannous chloride used in each sample was varied per Table IV. Also, certain samples employed magnesium oxide, which was obtained under the tradename Maglite™ D, as set forth in Table IV along with the physical characteristics of the TPVs. The hydrotalcite and magnesium oxide were added downstream within the mixer employed to conduct the dynamic vulcanization. Specifically, the recipe included 175 parts by weight of an oil-extended olefinic elastomeric copolymer (this amount includes 100 parts by weight rubber and 75 parts by weight oil), 41.6 parts by weight thermoplastic polypropylene homopolymer (28 parts Aristech™ D008M and 13.6 parts Borealis™ HF 136MO), 135 total parts by weight paraffinic oil (135 parts including the 75 parts inclusive with the rubber), 42 parts by weight clay, 3.4 part by weight wax, 4.4 parts by weight phenolic resin, 1.94 parts by weight zinc oxide, each based on 100 parts by weight of the elastomeric copolymer.

The extrusion surface roughness (ESR) was determined as described by Ellul et al., in "Chemical Surface Treatments Of Natural Rubber And EPDM Thermoplastic Elastomers: Effects On Friction And Adhesion," RUBBER CHEMISTRY AND TECHNOLOGY, Vol. 67, No. 4, pg. 582 (1994).

The data in Table IV shows that while hydrotalcite imparts marked improvement in reduced moisture uptake the magnesium oxide deleteriously increases moisture uptake even though both hydrotalcite and magnesium oxide have conventionally been considered for use as acid scavengers or bases.

Samples 41-48

Eight additional thermoplastic vulcanizates were prepared using the same ingredients and procedures as Samples 26-30, except that different hydrotalcites were employed as set forth in Table V. The hydrotalcite designated No. 2 was obtained under the tradename Alcamizer™ 1 (Kyowa). The hydrotalcite designated No. 3 was obtained under the tradename Alcamizer™ P93 (Kyowa). As with Samples 26-33, the hydrotalcite was added after pelletization.

TABLE IV

|  | Samples | | | | | | |
| --- | --- | --- | --- | --- | --- | --- | --- |
|  | 34 | 35 | 36 | 37 | 38 | 39 | 40 |
| Comparative/Inventive | I | I | C | C | C | C | C |
| SnCl$_2$ (phr) | 0.63 | 0.63 | 1.26 | 1.26 | 1.26 | 1.26 | 1.26 |
| Hydrotalcite No. 1 (% by weight of TPV) | — | 0.5 | — | 0.5 | 2.0 | — | — |
| MgO (% by weight of TPV) | — | — | — | — | — | 0.5 | 2.0 |
|  | Properties | | | | | | |
| Shore A Hardness | 65 | 64 | 65 | 65 | 64 | 65 | 65 |
| Specific Gravity | 0.964 | 0.952 | 0.946 | 0.957 | 0.963 | 0.959 | 0.962 |
| UTS (MPa) | 5.50 | 5.19 | 5.05 | 5.73 | 4.99 | 5.50 | 5.62 |
| Ultimate Elongation (%) | 354 | 391 | 335 | 379 | 366 | 349 | 360 |
| M100 (MPa) | 2.49 | 2.18 | 2.28 | 2.40 | 2.17 | 2.48 | 2.50 |
| ESR Ra | 85 | 54 | 80 | 86 | 56 | 56 | 48 |
| Tension Set | 10 | 13 | 10 | 11 | 8 | 15 | 11 |
| Weight Gain (%) | 86 | 87 | 88 | 85 | 96 | 81 | 86 |
| Compression Set (22 h @ 100° C.) | 25 | 31 | 26 | 28 | 30 | — | 25 |
| Moisture gain (8 weeks) | 0.240 | 0.171 | 0.337 | 0.232 | 0.166 | 0.493 | 0.549 |

TABLE V

| | Samples | | | | | | | |
|---|---|---|---|---|---|---|---|---|
| | 41 | 42 | 43 | 45 | 46 | 47 | 44 | 48 |
| Comparative/Inventive | C | C | C | I | I | I | C | I |
| SnCl$_2$ (phr) | 1.26 | 1.26 | 1.26 | 0.8 | 0.8 | 0.8 | 1.26 | 0.8 |
| Hydrotalcite No. 1 (% by weight of TPV) | — | — | — | — | — | — | 0.50 | 0.50 |
| Hydrotalcite No. 2 (% by weight of TPV) | — | 0.50 | — | — | 0.50 | — | — | — |
| Hydrotalcite No. 3 (% by weight of TPV) | — | — | 0.50 | — | — | 0.50 | — | — |
| Properties | | | | | | | | |
| ESR; median | 46 | 52 | 48 | 41 | 43 | 43 | 51 | 51 |
| Tension Set (%) | 10.5 | 10.5 | 10.5 | 10 | 10 | 10.5 | 11 | 11.5 |
| % moisture gain (8 weeks) | 0.375 | 0.259 | 0.239 | 0.256 | 0.194 | 0.197 | 0.200 | 0.197 |
| % Extractable (xylene) | 2.43 | — | — | 2.15 | — | — | — | — |
| % Extractable (cyclohexane) | 1.77 | — | — | 1.90 | — | — | — | — |
| Accelerated Heat Aging | | | | | | | | |
| Original Shore A | 67 | 66 | 68 | 67 | 68 | 68 | 73 | 73 |
| Aged Shore A | 66 | 66 | 66 | 65 | 68 | 67 | 69 | 69 |
| Points change | −1 | 0 | −2 | −2 | 0 | −1 | −4 | −4 |
| Original UTS(MPa) | 6.84 | 6.18 | 7.44 | 6.84 | 7.15 | 7.28 | 7.39 | 7.54 |
| Aged UTS (MPa) | 7.44 | 7.34 | 7.43 | 7.85 | 6.83 | 5.47 | 5.30 | 5.42 |
| % change | 9 | 19 | 0 | 15 | −4 | −25 | −28 | −28 |
| Original elongation (%) | 436 | 419 | 481 | 465 | 456 | 469 | 481 | 483 |
| Aged elongation | 478 | 473 | 472 | 501 | 456 | 386 | 328 | 335 |
| % change | 10 | 13 | −2 | 8 | 0 | −18 | −32 | −31 |
| Original M100(MPa) | 2.69 | 2.74 | 2.79 | 2.68 | 2.79 | 2.73 | 2.68 | 2.74 |
| Aged M100 (MPa) | 3.04 | 2.98 | 3.06 | 3.07 | 3.07 | 3.10 | 2.99 | 3.14 |
| % change | 13 | 9 | 10 | 15 | 10 | 13 | 11.6 | 14.5 |

The level of cure was determined for Samples 41 and 45 by determining the weight percent of the thermoplastic vulcanizate that was soluble in either boiling xylene or cyclohexane at room temperature.

The data in Table V shows that various hydrotalcites can be used within the bounds of the invention to further enhance the reduced hygroscopicity of the inventive thermoplastic vulcanizates.

Samples 49-51

Three additional thermoplastic vulcanizates were prepared using generally the same recipes and procedures set forth for Samples 41-48, and the stannous chloride and zinc oxide were varied. Samples of the thermoplastic vulcanizates were extruded and tested for surface roughness, spot count, and porosity. The remainder of the thermoplastic vulcanizates were stored conventionally (i.e., without special foil packaging) for an excess of 12 months at ambient conditions. The thermoplastic vulcanizates were then dried at 71° C. for 16 hours. Following drying, extrudates were prepared and analyzed for surface roughness, spot count, and porosity. The level of stannous chloride and zinc oxide, as well as the analytical data from the testing, is set forth in Table VI.

TABLE VI

| | Samples | | |
|---|---|---|---|
| | 49 | 50 | 51 |
| Comparative/Inventive | C | C | I |
| Zinc Oxide (phr) | 2.0 | 4.0 | 2.0 |
| SnCl$_2$ (phr) | 1.26 | 1.26 | 0.63 |
| Original | | | |
| Surface Roughness (Ra) | 56 | 61 | 52 |
| Spot Count | 40 | 34 | 35 |
| Porosity | n/a | n/a | n/a |
| After Storage and Drying | | | |
| Surface Roughness (Ra) | 90 | >100 | 45 |
| Spot Count | 45 | 47 | 30 |
| Porosity | high | high | none |

The surface spot count provides a quantitative measurement of the surface spots of an extruded elastomeric strip through the use of a visual inspection standard. In performing the test, a 1 inch or 1½ inch diameter extruder equipped with a 24:1 length/diameter screw having a 3-3.5 compression ratio was used. The extruder is fitted with a strip die that is 25.4 mm wide×0.5 mm thick×7-10 mm land length. A breaker plate is used with the die, but no screen pack is placed in front of the breaker plate. In preparing the extrudate, a temperature profile is employed to give a melt temperature of 200° C.±3° C. A hand-held temperature probe should be used to establish the melt temperature. With the extruder having three temperature zones within the feed zone, zone 1 should be set to 180° C., zone 2 should be set to 190° C., and zone 3 should be set to 200° C. The fourth zone, which is the die zone, should be set to 205° C. These temperatures should be controlled to ±6° C. When the zone temperatures have reached their set points, the screw should be started and about 1 kg of the sample should be loaded into the feed hopper. The extruder screw speed should be set to maintain an output of approximately 50 g±5 g per minute. The material should be allowed to flush through the extruder for at least five minutes before collecting any sample.

After the flow rate is adjusted to 50 g per minute and the extruder has been flushed for five minutes, all previously extruded material is removed and the strip is allowed to extrude to the floor, which will allow the weight of the strip to slightly draw down the profile and thereby counteract any differences in the material's velocity across the die face. By using a piece of cardboard that is long enough to collect a 12 inch sample, the upper edge of the cardboard should be moved into the extrudate while quickly rotating the bottom of the cardboard into the strip, thereby avoiding any further draw down. Both ends of the strip should be cut past the edges of the cardboard and allowed to cool. Three strips approximately 30-61 cm in length are prepared. Six inch sections of each strip are randomly chosen for counting the spots. The spots should be counted under bright light conditions with a 3 diopter magnification. To provide good contrast, the strips may be colored with black ink. All visible spots within the 6 inch section should be counted. The results of the three strips are averaged and rounded to the nearest whole number.

Likewise the porosity was determined by a visual measure of the quantity of pores that are visible on the surface of an extruded thermoplastic vulcanizate sample.

The data in Table VI shows that the use of stannous chloride in amounts greater than that of this invention serves to deleteriously reduce storage life of thermoplastic vulcanizates as evidenced by a degradation in surface properties and porosity, which is believed to result from increased moisture uptake, whereas the inventive samples showed unexpectedly superior surface properties and porosity after storage.

Samples 52-67

Sixteen additional thermoplastic vulcanizates were prepared by employing ingredients and procedures similar to Samples 1-16 except that the amount of zinc oxide, stannous chloride, and phenolic resin were varied as set forth in Table VII. Samples 52-55 employed 0.2 phr stannous chloride, 4.5 phr phenolic resin, and the amount of zinc oxide was varied. Samples 56-59 employed 0.6 phr stannous chloride, 4.5 phr phenolic resin, and the amount of zinc oxide employed was varied. Samples 60-63 employed 0.2 phr stannous chloride, 6.0 phr phenolic resin, and the amount of zinc oxide was varied. Samples 64-67 employed 0.6 phr stannous chloride, 6.0 phr phenolic resin, and the amount of zinc oxide was varied. Table VII also includes data from mechanical testing that was performed on each vulcanizate before and after accelerated heat aging.

TABLE VII

| | Samples | | | | | | | |
|---|---|---|---|---|---|---|---|---|
| | 52 | 53 | 54 | 55 | 56 | 57 | 58 | 59 |
| Comparative/Inventive | C | I | I | I | C | I | I | I |
| Phenolic Resin (phr) | 4.5 | 4.5 | 4.5 | 4.5 | 4.5 | 4.5 | 4.5 | 4.5 |
| Zinc Oxide (phr) | 0.125 | 0.25 | 0.5 | 1 | 0.125 | 0.25 | 0.5 | 1 |
| $SnCl_2$ (phr) | 0.2 | 0.2 | 0.2 | 0.2 | 0.6 | 0.6 | 0.6 | 0.6 |
| Properties | | | | | | | | |
| Tension Set (%) | 9.0 | 6.0 | 8.5 | 10.0 | 7.5 | 5.5 | 7.0 | 7.5 |
| Weight Gain (%) | 126 | 113 | 121 | 144 | 91 | 83 | 87 | 97 |
| Accelerated Heat Aging | | | | | | | | |
| Original UTS(MPa) | 6.32 | 5.85 | 6.66 | 4.72 | 6.24 | 7.76 | 6.48 | 5.79 |
| Aged UTS (MPa) | 1.21 | 2.58 | 3.16 | 2.29 | 1.84 | 1.49 | 3.39 | 4.56 |
| % change | −80.8 | −55.9 | −52.5 | −51.6 | −70.5 | −80.8 | −47.6 | −21.3 |
| Original elongation (%) | 394 | 381 | 416 | 319 | 344 | 367 | 309 | 298 |
| Aged elongation | 5 | 97 | 207 | 107 | 26 | 2 | 223 | 255 |
| % change | −98.8 | −74.5 | −50.3 | −66.6 | −92.4 | −99.4 | −27.9 | −14.7 |
| Original M100(MPa) | 2.77 | 2.59 | 2.82 | 2.41 | 2.87 | 3.30 | 3.25 | 3.05 |
| Aged M100 (MPa) | 0.00 | 1.71 | 2.30 | 1.15 | 0.00 | 0.00 | 2.43 | 2.74 |
| % change | −100 | −34.0 | −18.5 | −52.4 | −100 | −100 | −25.3 | −10.0 |
| | Samples | | | | | | | |
| | 60 | 61 | 62 | 63 | 64 | 65 | 66 | 67 |
| Comparative/Inventive | C | I | I | I | C | I | I | I |
| Phenolic Resin (phr) | 6.0 | 6.0 | 6.0 | 6.0 | 6.0 | 6.0 | 6.0 | 6.0 |
| Zinc Oxide (phr) | 0.125 | 0.25 | 0.5 | 1 | 0.125 | 0.25 | 0.5 | 1 |
| $SnCl_2$ (phr) | 0.2 | 0.2 | 0.2 | 0.2 | 0.6 | 0.6 | 0.6 | 0.6 |
| Properties | | | | | | | | |
| Tension Set (%) | 13.0 | 9.0 | 7.0 | 6.0 | 15.0 | 7.5 | 6.0 | 6.0 |
| Weight Gain (%) | 269 | 112 | 106 | 111 | 274 | 84 | 80 | 83 |
| Accelerated Heat Aging | | | | | | | | |
| Original UTS(MPa) | 4.06 | 6.06 | 6.87 | 5.89 | 4.39 | 6.98 | 6.45 | 5.16 |
| Aged UTS (MPa) | 3.41 | 1.37 | 2.48 | 4.13 | 2.15 | 1.61 | 2.76 | 4.72 |
| % change | −16.1 | −77.4 | −63.9 | −29.8 | −51.0 | −77.0 | −57.2 | −8.5 |
| Original elongation (%) | 543 | 286 | 364 | 295 | 627 | 315 | 234 | 267 |
| Aged elongation | 2 | 5 | 139 | 267 | 3 | 2 | 80 | 218 |
| % change | −99.6 | −98.4 | −61.9 | −9.5 | −99.6 | −99.3 | −66.0 | −18.3 |
| Original M100(MPa) | 1.85 | 3.38 | 3.08 | 3.20 | 1.81 | 3.23 | 3.91 | 2.85 |
| Aged M100 (MPa) | 0.00 | 0.00 | 2.14 | 2.57 | 0.00 | 0.00 | 0.00 | 3.17 |
| % change | −100.0 | −100.0 | −30.6 | −19.7 | −100.0 | −100.0 | −100.0 | 11.3 |

Table VII suggests that the presence of a metal oxide, such as zinc oxide, is an important factor in preparing thermoplastic vulcanizates that have a useful cure and useful tolerance to heat aging. Moreover, the data demonstrates the unexpected findings that were observed. In particular, the heat stability of the thermoplastic vulcanizates dropped when less than 0.25 phr zinc oxide was employed. While the heat aging data associated with Sample 57 and 65 appear to be anomalous with respect to heat aging properties, the level of cure, as suggested by the weight gain data, show that the use of 0.25 phr zinc oxide is unexpectedly more beneficial than the use of 0.125 phr zinc oxide.

Samples 68-77

Ten additional thermoplastic vulcanizates were prepared by using ingredients and procedures similar to Samples 1-16. Samples 68-72 employed 4.5 phr phenolic resin, and the amount of stannous chloride employed was varied as set forth in Table VIII. Similarly, Samples 73-77 employed 6.0 phr phenolic resin, and the amount of stannous chloride was varied as set forth in Table VIII. Table VIII also includes the results of physical testing that was performed on the various thermoplastic vulcanizates. Each sample included 0.5 phr zinc oxide.

TABLE VIII

| | Samples | | | | | | | | | |
|---|---|---|---|---|---|---|---|---|---|---|
| | 68 | 69 | 70 | 71 | 72 | 73 | 74 | 75 | 76 | 77 |
| Comparative/Inventive | C | C | I | I | I | C | C | I | I | I |
| SnCl$_2$ (phr) | 0 | 0.1 | 0.2 | 0.6 | 1.2 | 0.0 | 0.1 | 0.2 | 0.6 | 1.2 |
| Phenolic Resin | 4.5 | 4.5 | 4.5 | 4.5 | 4.5 | 6.0 | 6.0 | 6.0 | 6 | 6 |
| | | | | Properties | | | | | | |
| Shore A Hardness | 55.0 | 60.5 | 60.0 | 62.5 | 6.37 | 55.5 | 60.4 | 61.9 | 64.3 | 65.8 |
| Shore A Hardness (leverload) | 55 | 59 | 61 | 62 | 64 | 55 | 59 | 62 | 62 | 65 |
| Specific Gravity | 0.966 | 0.962 | 0.962 | 0.964 | 0.962 | 0.960 | 0.962 | 0.962 | 0.961 | 0.965 |
| UTS (MPa) | 4.30 | 5.89 | 6.66 | 6.48 | 6.37 | 4.73 | 6.56 | 6.87 | 6.45 | 6.70 |
| Ultimate Elongation (%) | 602 | 475 | 416 | 309 | 259 | 560 | 433 | 364 | 234 | 243 |
| M100 (MPa) | 1.83 | 2.33 | 2.82 | 3.25 | 3.52 | 1.93 | 2.65 | 3.08 | 3.91 | 3.71 |
| Tension Set | 15.0 | 9.0 | 8.5 | 7.0 | 6.0 | 12.5 | 8.0 | 7.0 | 6.0 | 6.0 |
| Weight Gain (%) | 271 | 164 | 121 | 87 | 78 | 270 | 139 | 106 | 80 | 71 |

The data in Table VIII suggests that the presence of stannous chloride is important in the preparation of useful thermoplastic vulcanizates. In particular, where less than 0.2 phr stannous chloride was employed, an advantageous cure could not be achieved as suggested by the extremely high weight gain observed in the comparative examples.

Various modifications and alterations that do not depart from the scope and spirit of this invention will become apparent to those skilled in the art. This invention is not to be duly limited to the illustrative embodiments set forth herein.

What is claimed is:

1. A composition comprising:
   (i) a dynamically-cured rubber;
   (ii) from about 20 to about 300 parts by weight of an isotactic polypropylene having a melt temperature of from 150° C. to 175° C. and a density of from 0.85 g/cc to 0.91 g/cc per 100 parts by weight rubber;
   (iii) from 0.3 to 0.9 parts by weight stannous chloride per 100 parts by weight rubber;
   (iv) from 0.4 to 0.7 parts by weight zinc oxide per 100 parts by weight rubber;
   (v) from about 0.1 to about 5% by weight, based upon the total weight of the composition, of a natural or synthetic hydrotalcite; and
   (vi) from about 30 to about 250 parts by weight oil per 100 parts by weight rubber wherein
   said composition exhibits an elongation retention in excess of 80% after heat aging at 125° C. for six weeks,
   said composition exhibits a tensile strength retention in excess of 80% after heat aging at 125° C. for six weeks,
   said dynamically-cured rubber is cured with a phenolic resin consisting of a blend of about 33% by weight of the total resin octvlphenol-formaldehyde and about 67% by weight of the total resin nonylphenol-formaldehyde by dynamic vulcanization to an extent where not more than 3 weight percent of the rubber is extractable by using cyclohexane or boiling xylene as an extractant and
   said dynamically-cured rubber is in the form of discrete particles within the isotactic polypropylene, and where the discrete particles have an average particle size that is less than 5 μm.

2. A molded article or extrudate prepared from the composition of claim 1.

3. A process for forming a thermoplastic vulcanizate comprising:
   (vii) dynamically vulcanizing a rubber comprising an olefinic elastomeric copolymer including units deriving from ethylene, at least one α-olefin, and at least one diene monomer within a blend that comprises the rubber and a polypropylene, where said step of vulcanizing is carried out by using 2 to 9 parts by weight phenolic resin curative per 100 parts by weight rubber in the presence of 0.2 to 0.9 parts by weight stannous chloride per 100 parts by weight rubber and 0.25 to 0.8 parts by weight zinc oxide per 100 parts by weight rubber;
   (viii) curing the rubber to an extent where not more than 3 weight percent of the rubber is extractable by using cyclohexane or boiling xylene as an extractant; and
   (ix) adding an acid scavenger comprising a hydrotalcite compound, where the hydrotalcite compound is added in an amount from about 0.1 to about 5 percent by weight based on the total weight of the thermoplastic vulcanizate after the curing step
   wherein said composition exhibits an elongation retention in excess of 80% after heat aging at 125° C. for six weeks, and the phenolic resin curative consisting of a blend of about 33% by weight of the total resin curative octylphenol-formaldehyde and about 67% by weight of the total resin curative nonylphenol-formaldehyde.

4. A composition according to claim 1, wherein said phenolic resin farther comprises a methylol group.

5. A thermoplastic vulcanizate made by the process of claim 3, wherein said phenolic resin further comprises a methylol group.

* * * * *